United States Patent

Powell

[11] 3,920,040
[45] Nov. 18, 1975

[54] PRESSURE CONTROL SYSTEM
[75] Inventor: Walter W. Powell, Houston, Tex.
[73] Assignee: Anderson, Greenwood & Co., Bellaire, Tex.
[22] Filed: Oct. 23, 1973
[21] Appl. No.: 408,855

[52] U.S. Cl. ............ 137/458; 137/461; 137/489.5
[51] Int. Cl.² ........................................ F16K 17/00
[58] Field of Search ............... 137/458, 461, 489.5

[56] References Cited
UNITED STATES PATENTS

| | | | |
|---|---|---|---|
| 3,083,726 | 4/1963 | Woelfel | 137/458 |
| 3,161,207 | 12/1964 | McCarvell | 137/458 X |
| 3,389,718 | 6/1968 | Johnson | 137/458 X |
| 3,746,047 | 7/1973 | Peters | 137/458 X |

*Primary Examiner*—Harold W. Weakley
*Attorney, Agent, or Firm*—Vinson, Elkins, Searls, Connally & Smith

[57] ABSTRACT

A control system for shutting down a fluid system when its pressure falls outside of preselected high and/or low pressure limits which control system includes a pressure responsive shut-down valve connected to shut down said fluid system, a control valve controlling the actuating fluid to said shut down valve, an activator connected to actuate said control valve and at least one pilot connected to sense the pressure of the fluid system and to provide response to the fluid system pressure falling outside its preselected limits to the activator whereby said activator moves the control valve to shut-down position, a manual override having a locking piston externally actuated to lock the piston of said activator in normal position for start-up, said locking piston being disengaged responsive to pressure differentials thereacross when pressure in the fluid system exceeds the preselected low pressure limit.

7 Claims, 5 Drawing Figures

PRESSURE CONTROL SYSTEM

BACKGROUND OF THE INVENTION

Fluid systems normally under pressure such as gas well production equipment and pipelines are preferably provided with a shut-down valve which is to be actuated whenever the system pressure falls outside preset limits, such as a maximum or minimum desired pressure. In a control system including such shut-down valve, it is desired that the system have good repeatability so that the maximum and minimum pressures may be accurately preset. Also the system is preferred to have a snap acting response and to be of the non-flowing or non-bleeding type.

SUMMARY

The present invention relates to an improved pressure control system for a fluid system.

An object of the present invention is to provide an improved pressure control system for a fluid system which may be accurately preset to actuate a safety device responsive to the fluid system pressures which fall outside normal desired operating pressures defined by a maximum or a minimum pressure setting.

Another object is to provide an improved pressure control system having snap-acting response and which bleeds only a minimum of actuating fluid in performing a shut-down of the fluid system it is controlling.

A further object is to provide an improved pressure control system with a relative simple start-up procedure not requiring constant attention of an attendant.

Still another object is to provide an improved pressure control system which may be connected to reset to operational position after a shut-down and responsive to the return of the fluid system pressure to normal desired operating pressure or to reset only by manual operation.

BRIEF DESCRIPTION OF THE DRAWINGS

These and other objects and advantages of the present invention are hereinafter more fully described and explained with reference to the drawings wherein.

DESCRIPTION OF THE PREFERRED EMBODIMENTS

The fluid pressure system to be protected by the improved control system of the present invention is shown as a line 10 controlled by the shut-down valve 12. Shut-down valve 12 is a type which is held in its open position by control pressure supplied to its actuator 14 and is biased toward its closed position so that it closes whenever the control pressure is exhausted from its actuator 14.

It should be noted that any type of safety device may be actuated by the control system and the shut-down valve 12 is illustrative of one embodiment of such safety device.

Figure 1:
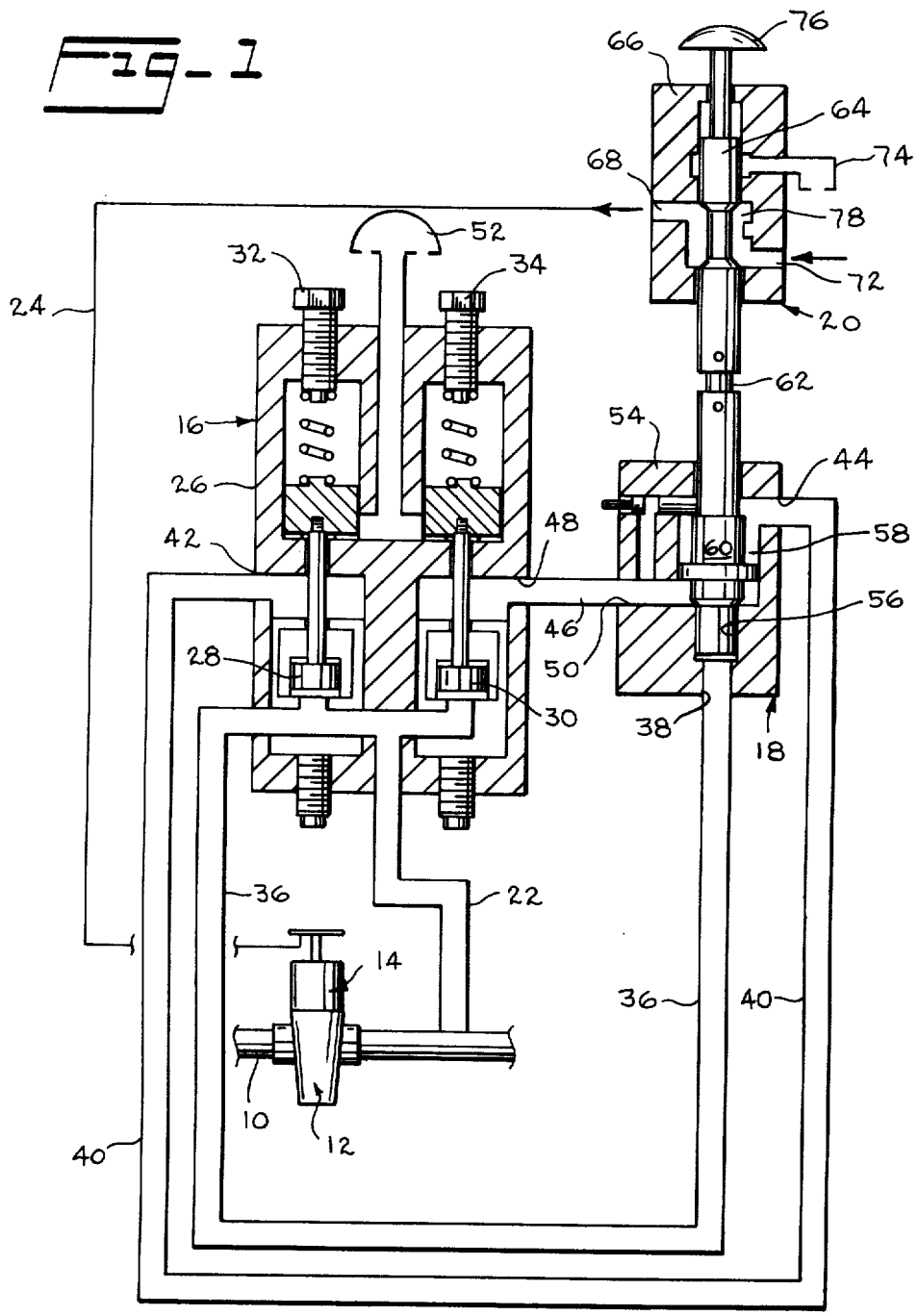
FIG. 1 is a schematic illustration of the pressure control system of the present invention connected to a shut-down valve to cause such valve to close whenever the fluid system pressure is below the preset minimum desired pressure or above the preset maximum desired pressure.
Figure 2:
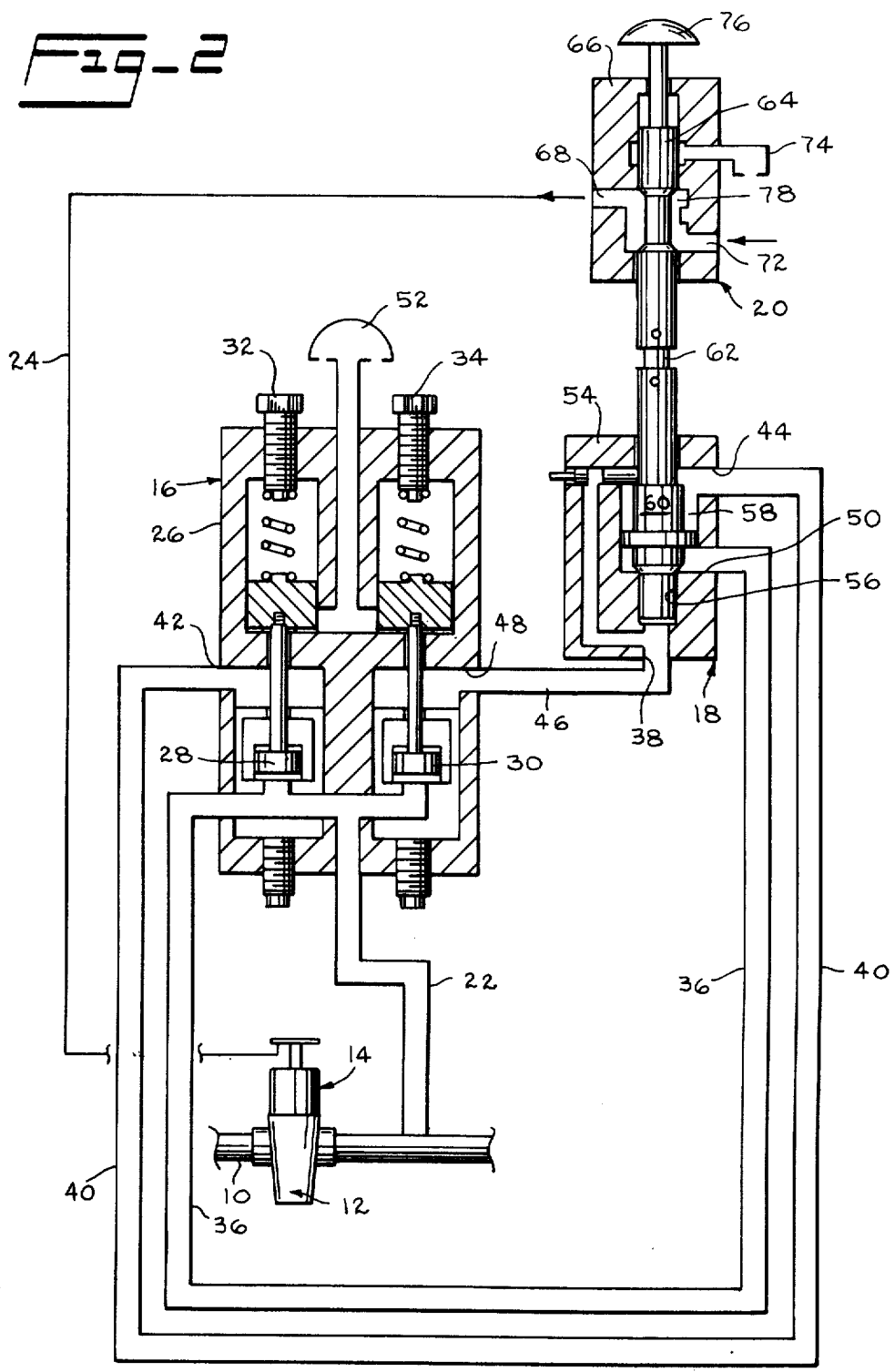
FIG. 2 is a schematic illustration of a modified form of the present invention having manual resetting of the control valve and activator.

The control system includes the pilot valve 16 which, as shown in FIGS. 1 and 2, is a double or high and low pressure pilot, the activator 18 and the control valve 20. As shown, line 22 provides the sensing connection between pilot valve 16 and the fluid system 10. Also line 24 connects from control valve 20 to shut-down valve 12. The other connections are as shown in the drawings and hereinafter described. If desired shut-down valve 12 may utilize pressure to close and with that type valve the connections between the components would be changed accordingly.

It is preferred that the pilot valve 16 be of a type having minimum friction and a snap action. Such a pilot valve is disclosed in U.S. Pat. No. 3,568,706 which discloses a suitable single pilot valve. The schematic drawings of FIGS. 1 and 2 illustrate a double pilot in a single body. This type of pilot valve has a minimum friction since it does not have any sliding seals.

The pilot valve 16 is a high and low pressure pilot and includes the body 26 having the two valve members 28 and 30 mounted therein to control flow through the two inlet seats and the two exhaust seats with each of the valve members having a pressure adjustment knob 32 and 34 so that valve member 28 may be set to exhaust control pressure whenever the system pressure exceeds the preselected maximum pressure and valve member 30 may be set to control pressure whenever the system pressure falls below the preselected minimum pressure.

The line pressure which is conducted to pilot valve 16 through line 22 is delivered to both sides of pilot valve 16 and is conducted through line 36 to port 38 of activator 18. Line 40 conducts control pressure from the control port 42 of the high pressure side of pilot 16 to the port 44 of activator 18. Line 46 conducts control pressure from control pressure port 48 of the low pressure side of pilot 16 to the port 50 of activator 18. Vent 52 provides the vent for both high and low pressure sides of pilot valve 16. With pilot valve 16 connected as shown it controls the operation of activator 18.

The activator 18 includes the body 54 defining the small chamber 56 in communication with port 38 and the large chamber 58 with ports 44 and 50 being in communication with opposite ends of chamber 58. The piston 60 is positioned within the chambers 56 and 58 for reciprocation therein. Piston 60 extends outward through body 54 and is connected by connecting rod 62 to the spool 64 of control valve 20. Thus with such direct connection piston 60, connecting rod 62 and spool 64 all move together.

Control valve 20 is shown to be a three way valve with its body 66 defining the port 68 which is connected by line 24 to the actuator 14, the inlet port 72 which is connected to a supply of actuating fluid and the vent 74. The end of spool 64 opposite to connecting rod 62 extends outward from body 66 and terminates in palm button 76 so that if desired control valve 20 may be manually set. The interior of body 66 and the exterior of spool 64 define the chamber 78 through which actuating fluid flows. When spool 64 is in the position shown in FIG. 1 flow is directed from inlet port 72 to port 68. Movement of spool 64 to its other or shutdown position closes flow from inlet port 72 to port 68 and opens the flow from port 68 through chamber 78 and out vent 74 thereby venting actuating fluid from actuator 14 of valve 12. This causes valve 12 to shut down the fluid system 10. While control valve 20 is shown to be a three-way valve, if actuating fluid is supplied to actuator 14 from a separate source, control valve 20 may be a two-way valve, that is, inlet port 72 would be blocked and not used. In such system the supply of actuating fluid to actuator 14 should be sufficiently restricted so that when control valve 20 is actuated, actuating fluid is exhausted as quickly as desired from actuator 14.

Figure 5:
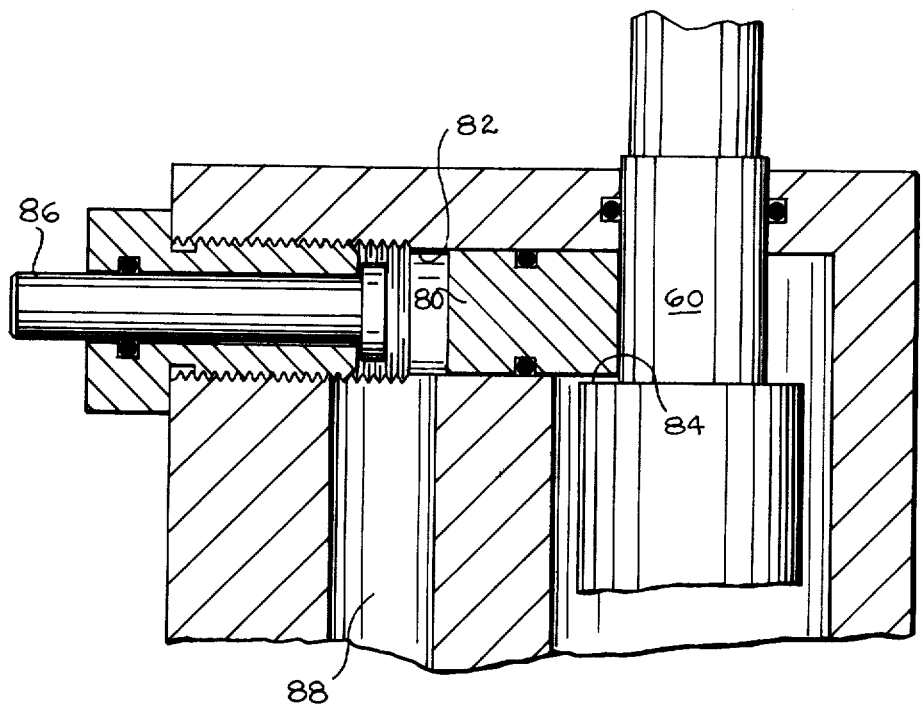
FIG. 5 is a partial detail sectional view illustrating the override structure.

The override piston 80 as best shown in FIG. 5 is positioned in the bore 82 which communicates with the port 44 side of chamber 58. When piston 80 is in its innermost position, it engages the shoulder 84 on piston 60 to lock piston 60 in its innermost position. Piston 80 is moved to its locking or innermost position by the plunger 86. Passage 88 provides communication between bore 82 and the port 50. Thus, as hereinafter described when piston 80 is moved to locking position it is exposed to control pressure at each end to retain its position until the pressure at port 50 is exhausted at which time the pressure on the inner end of piston 80 moves the piston back into bore 82 out of engagement with shoulder 84 on piston 60.

To perform the initial start-up of the control system and before pressure is applied from line 10, palm button 76 is pushed in to set the control valve 20 in open position and to set actuator 18 in operational position. Override plunger 86 is pushed to move the override piston 80 into locking engagement with piston 60. Application of pressure from line 10 to pilot valve 16 causes pressure to be applied through line 36 to port 38 and through the control ports 42 and 48, lines 40 and 46 to the ports 44 and 50 respectively. The effective pressure areas on piston 60 are such that the similar areas on both sides of the piston 60 within chamber 58 are equal and the end area of piston 60 is smaller than these two annular areas.

Thus, with full pressure on activator 18 the piston 60 is urged by pressure in the outward direction but is locked against such movement by the override piston 80. When pressure in system 10 exceeds the low pressure limit setting, valve member 30 opens to exhaust pressure from port 50. This exhausts pressure from behind override piston 80 which is forced out of locking engagement by the pressure in chamber 58 from port 44. So long as the pressure in fluid system 10 remains above the preset minimum and below the preset maximum settings of pilot valve 16, piston 60 remains in operational position holding spool 64 in position to cause actuating fluid to be delivered to actuator 14 of valve 12 to hold valve 12 open.

Whenever the pressure in fluid system 10 falls below the preset minimum desired pressure the valve member 30 is moved to close the exhaust seat and open the inlet seat delivering pressure through port 48, line 46 and port 50 to exert equalizing pressure on the large annular area of piston 60, causing piston 60 to be moved outward whereby control valve 20 is moved to vent position venting actuating fluid from actuator 14 causing valve 12 to close.

Pressure in the fluid system 10 in excess of the maximum desired pressure setting of pilot valve 16 also causes activator 18 and control valve 20 to respond resulting in the closing of valve 12. Whenever such pressure is reached it causes valve member 28 to close its inlet seat and open its exhaust seat whereby control pressure is exhausted through line 40 from the outer portion of large chamber 58 of activator 18. This leaves only the pressure applied through port 38 acting on piston 60 to move piston 60 outward, moving control valve 20 to an exhaust position. Responsive to the exhausting of actuating fluid from actuator 14, valve 12 closes shutting down the fluid system 10.

With the control system shown in FIG. 1, the control becomes operative automatically whenever there has been a high or low pressure shut-down and thereafter the fluid system pressure returns to a normal pressure. Thus it can be said that the control system has an automatic reset feature.

After a low pressure shut-down the return of the fluid system pressure to normal increases the fluid pressure acting on the valve member 30 causing it to close its inlet seat and open its exhaust seat to thereby exhaust pressure from the port 50 side of chamber 58. Since the annular area of piston 60 exposed to the port 44 pressure in chamber 58 is larger than the area of piston 60 exposed to port 38 pressure, the piston 60 is moved inward, returning activator 18 to operational position. This movement of piston 60 moves spool 64 to provide a connection through control valve 20 to supply actuating fluid from line 72 through line 24 to actuator 14 to open valve 12 thus resetting the control system.

After a high pressure shut down, the return of the fluid system pressure to normal decreases the fluid pressure acting on the valve member 28 causing it to move responsive to its spring loading to close its exhaust seat and to open its inlet seat. In this position control pressure is directed through line 40 and port 44 into the outer end of chamber 58. This pressure, being on the larger annular area than the area at the inner end of piston 60 moves piston 60 inward and resets control valve to supply actuating fluid to actuator 14.

In some applications it may be desirable that the control system of the present invention not have the automatic reset feature. The control system illustrated in FIG. 2 provides for manual reset only and differs from the control system of FIG. 1 only by a revision of the connecting lines from pilot 16 to activator 18 so that port 42 is in communication with the outer end of large chamber 58, line 36 communicates with the inner end of large chamber 58, and port 48 is in communication with port 38 and with the outer side of override piston 80. With these connections whenever there is a pressure shut-down piston 60 is moved to its outer or shutdown position and upon return of the system pressures to normal the fluid pressures are exerted on the two annular areas of piston 60 within large chamber 58. Since these areas of piston 60 are equal, reset may only be accomplished manually by depressing the palm button 76. Thus, at all times when the fluid system 10 has a normal operating pressure the piston 60 is exposed to equal pressure forces by the pressure loading of both sides thereof in large chamber 58. Resetting however, does not require the use of the override lock since normal pressures are conducted to activator 18 and it does not move until a shut-down condition occurs.

The override piston 80 in the control system of FIG. 2 functions to lock piston 60 against movement responsive to the pressure in the inner or port 38 end of piston 60 until the system pressure rises sufficiently to move valve member 30 to open its exhaust seat. Thereafter exhaustion of pressure through the low pressure side of pilot valve 16 exhausts the pressure holding piston 80 in its locking engagement with piston 60 and with chamber 58 pressure moving piston 80 outward the system is ready to perform its shut-down function whenever the fluid system pressure falls outside its preselected limits as set by the pressure adjusting knobs 32 and 34.

Figure 3:
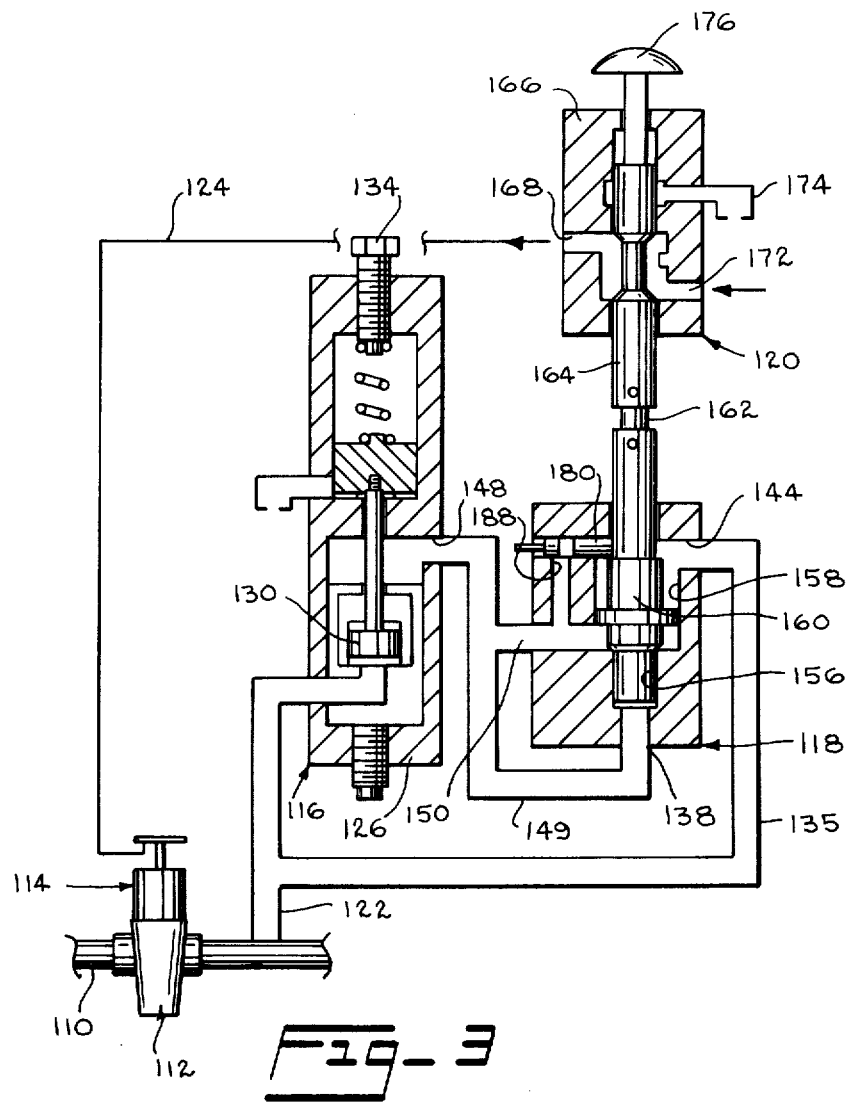
FIG. 3 is a schematic illustration of another modified form of the present invention adapted to respond only to the system pressure falling below the preset minimum desired pressure.

The control system illustrated in FIG. 3 provides for the shut-down of the fluid system only responsive to pressures falling below a preselected minimum desired pressure. This fluid system is illustrated as the line 110 leading to the shutdown valve 112 which is controlled by the actuator 114. Pressure in the line 110 is supplied to the pilot valve 116 through the line 122. Pilot valve 116 controls pressure delivered to activator 118 which is directly connected to operate control valve 120 and control valve 120 is connected to deliver actuating fluid to and exhaust actuating fluid from actuator 114 through line 124.

The pilot 116 has a body 126 in which there is defined a central chamber in which the valve member 130 is adapted to reciprocate. In one position the valve member 130 closes the exhaust seat and leaves the inlet seat open to supply control pressure and in its other position it closes the inlet seat and opens the exhaust seat to vent control pressure. The pressure setting of pilot valve 116 is set by adjusting knob 134.

Activator 118 is supplied with the sensed line pressure through line 135 into port 144 which is in communication with the outer end of large chamber 158. Control pressure from pilot valve 116 is supplied through port 148 and line 149 to ports 138 and 150 of activator 118. Port 138 communicates with the inner end of small chamber 156 and port 150 communicates both to the inner end of large chamber 158 and the outer end of override piston 180. Piston 160 reciprocates within the chambers 156 and 158. The opposite annular areas of piston 160 exposed to pressure in large chamber 158 are of equal and larger than the area of the inner end of piston 160 exposed to pressure within the small chamber 156.

Control valve 120 is operated by the connecting rod 162 connecting to piston 160 and to spool 164. Spool 164 reciprocates within the recess defined in the body 166 of control valve 120. In one position spool 164 opens flow from inlet port 172 which is connected to a suitable supply of actuating fluid to port 168 which connects to line 124 and in its other position closes inlet port 172 and provides communication from port 168 to vent 174. The end of spool 164 opposite connecting rod 162 extends outward from body 166 and terminates in palm button 176.

The override piston 180 is exposed to the pressure in the outer end of chamber 158 on its inner face and is exposed to control pressure from pilot 116 on its outer face by the passage 188. Such control pressure holds piston 180 in locking engagement with piston 160 during start-up. With piston 160 in its operational position pressure communication may be provided from line 110 through lines 122 and 135 to pilot valve 116 and to activator 118.

Since on initial start-up the inlet valve of pilot 116 is open, pressure is conducted to the control port 148 and through line 149 to the ports 138 and 150 of activator 118. As can be seen, the pressure forces on piston 160 would move it to shut-down position on start-up if it were not retained in operational position by the override piston 180.

As soon as the pressure in line 110 exceeds in preset minimum desired pressure the valve member 130 is moved to close its inlet seat and open its exhaust seat whereby control pressure is exhausted from the small chamber 156, from the inner end of large chamber 158, and from the outer face of override piston 180. Piston 180 is moved out of locking engagement with piston 160 by the pressure on its inner face. The pressure on the outer side of piston 160 in larger chamber 158 retains piston 160 and thus spool 164 of control valve 120 in operational position.

When the pressure within line 110 falls below the pilot minimum setting, valve member 130 is actuated to close the exhaust seat, open the inlet seat and supply control pressure through line 149 to ports 138 and 150. The pressure supplied to port 150 balances the forces on piston 160 in large chamber 158 and the pressure supplied to the small chamber 156 creates an additional force to move piston 160 and spool 164 to shut-down position. This exhausts the actuating fluid from actuator 114 causing valve 112 to close.

With the control system having been shut down, the control system shown in FIG. 3 becomes operative automatically with the increase of pressure of the fluid system above the preset minimum desired pressure. This causes valve member 130 to again move to close the inlet seat and open the exhaust seat exhausting control pressure from pilot valve 116 and from actuator 118. With the only pressure exerted on piston 160 being at the outer end of large chamber 158 such pressure forces piston 160 and spool 164 to their operational positions. With actuating fluid again supplied to actuator 114, the valve 112 is opened and the fluid system is operational.

In the event that such automatic reset is not desired the control system shown in FIG. 3 may be modified by connecting line 135 to both ports 144 and 150 to provide equal pressures to the opposite sides of piston 160 in large chamber 158. The control pressure port 148 is connected to port 138 and also to the outer face of override piston 180. Initial start-up is the same as described with all pressure areas of piston 160 being exposed to pressure and override piston 180 retaining piston 160 in operational position. When the system pressure rises above the preset minimum desired pressure the pilot valve 116 exhausts pressure from the small end of piston 160 and from the outer face of piston 180. Pressure in chamber 158 moves piston 180 out of engagement with piston 160 and the pressure forces on piston 160 being balanced piston 160 remains in operational position. Whenever the fluid system pressure falls below the preset minimum desired pressure the pilot valve 116 provides control pressure to port 138 causing piston 160 and spool 164 to move to shut down position exhausting actuator 114 to close valve 112.

Figure 4:
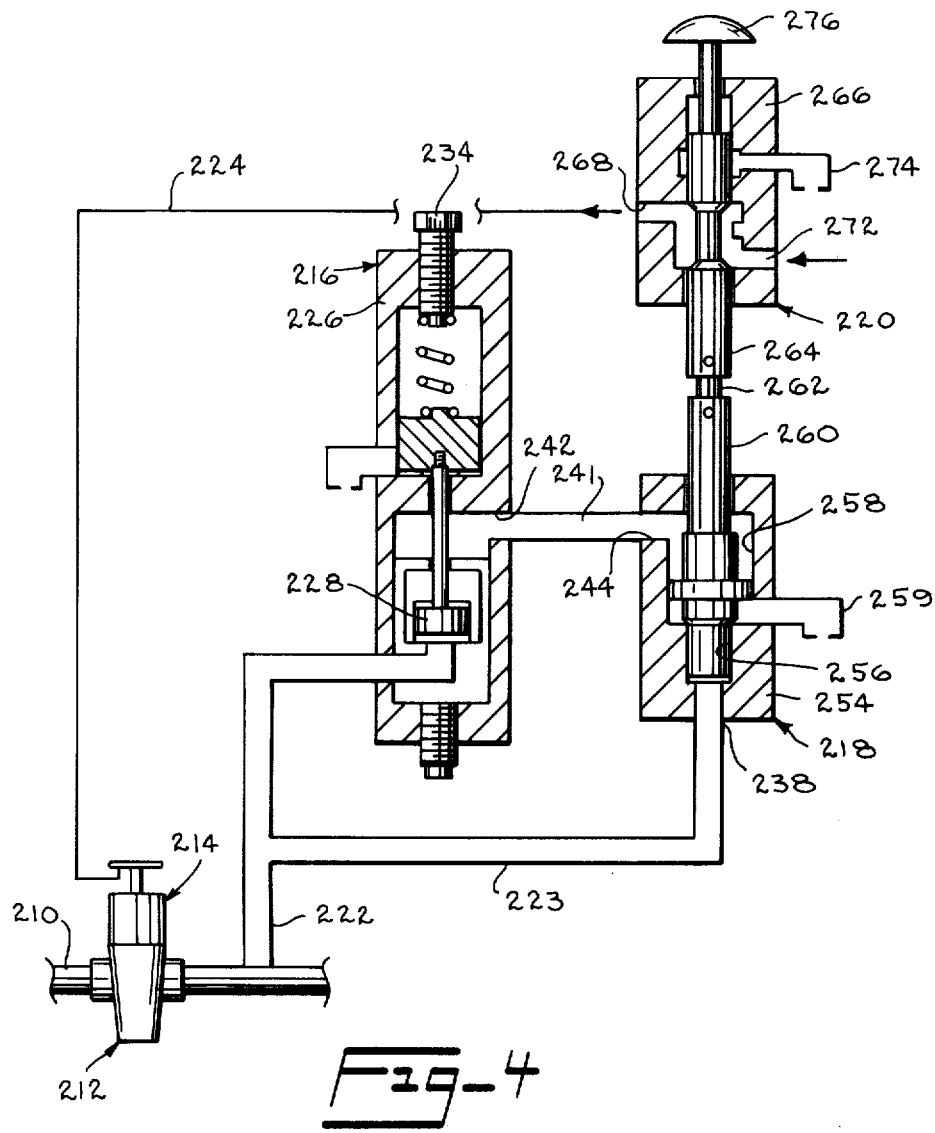
FIG. 4 is a schematic illustration of still another modified form of the invention adapted to respond only to the system pressure exceeding the preset maximum desired pressure.

In applications in which only a high pressure shutdown is desired a modified control system, such as shown in FIG. 4, may be used. In such system the fluid system is illustrated as the line 210 which is controlled by the shut-down valve 212 having an actuator 214. The pilot valve 216 is a single pilot having suitable connections to activator 218 which operates control valve 220. Pressure from the fluid system line 210 is conducted to pilot valve 216 by line 222 and to port 238 of activator 218 by line 223. Line 224 supplies actuating fluid to actuator 214.

Pilot valve 216 includes the body 226 in which the valve member 228 reciprocates to close alternately one of the inlet seat or the exhaust seat. Adjusting knob 232 is used to preset the maximum desired system pressure. Control pressure communication is provided by line 241 from control port 242 to the port 244 which is in communication with the outer end of the large chamber 258 defined in activator body 254.

Piston 260 reciprocates in large chamber 258 and small chamber 256 defined in body 254. The outer end of piston 260 is connected by connecting rod 262 to spool 264. Vent 259 connects to vent the inner end of large chamber 258.

The reciprocation of spool 264 in control valve body 266 controls the flow of actuating fluid from port 272 which is connected to a suitable supply of actuating fluid through the recess defined between body 266 and spool 264 to the port 268 or to exhaust actuating fluid from port 268 through such recess to the vent 274. Spool 264 extends through body 266 and terminates in palm button 276.

In operation fluid pressure from the fluid system line 210 is connected to the control system through lines 222 and 223. With start-up, pressure is conducted to both ports 238 and 250 at the same time. Since the area of piston 260 in large chamber 258 is larger than the area of piston 260 which is exposed to pressure from port 238, the piston 260 is initially moved to operational position.

Whenever the pressure in fluid system line 210 exceeds the maximum desired pressure presetting of pilot 216, the valve member 228 moves to close its inlet seat and open its exhaust seat exhausting the control pressure from the outer end of large chamber 258. With this pressure exhausted piston 260 which is then exposed only to the pressure from port 238 moves outward responsive thereto. This moves spool 264 to exhaust position exhausting actuating fluid from actuator 214 through line 224. With actuating fluid exhausted valve 212 closes to shut-down the fluid system.

As in start-up previously described with respect to the control system of FIG. 4 the system includes an automatic resetting of the control valve 220 and activator 218 to their operational position. This is effected by the fluid system pressure falling below the preset maximum desired pressure so that pilot valve member 228 closes its exhaust seat and opens its inlet seat to provide control pressure to activator 218. With pressure in the outer end of large chamber 258, activator 218 and control valve 220 are moved to their operational position.

If it is desired that the control system not have the automatic resetting of control valve 220 and activator 218, line 223 is connected to the port shown as vent 259 and port 238 is vented. With such connection the occurrence of a shut-down moves piston 260 and spool 264 to their shut-down position and thereafter the return of the system pressure to normal provides control pressure to activator 218. However, since the areas of the opposite sides of piston in chamber 258 are equal and exposed to the same pressure there is no automatic resetting of activator 218 and control valve 220 to operational position. When such system is to be reset it may be done manually by pushing palm button 276 inward.

From the foregoing it can be seen that the present invention provides an improved control system for a fluid pressure system which quickly shuts down the system at any time the system pressure falls outside the desired normal operating pressure limits. The system can be used either as a high pressure shut-down system, as a low pressure shut-down system or as a combination high and low pressure shut-down system. The system provides either automatic resetting of the system so that whenever the pressure of the fluid system returns to the normal operating pressures it will again become operative or it may be set so that it becomes operative only after being manually reset. Further, there is a provision for an override connection with the activator piston for start-up which holds the activator piston in operative position until the fluid system pressures have stabilized within the operating range and thereafter the system automatically disengages the override and becomes operative.

What is claimed is:

1. A pressure control system for a fluid system under pressure comprising
   a pressure responsive pilot valve,
   means connecting the pilot valve to a fluid system to be controlled for delivering fluid under pressure from said fluid system to said pilot valve,
   said pilot valve including means for presetting a preselected pressure condition at which said pilot valve responds by discharging said fluid under pressure,
   an activator,
   a control valve,
   said activator being mechanically interconnected to said control valve and being responsive to fluid pressures,
   means connecting said pilot valve to said activator to supply and vent said fluid under pressure discharged therefrom to said activator,
   a safety device having a pressure responsive actuator,
   means supplying actuating fluid under pressure to said control valve,
   means connecting said control valve to said safety device actuator to control the delivery of actuating fluid to said safety device actuator whereby on occurrence of said preselected pressure condition in said fluid system said safety device is actuated to control pressure in said fluid system,
   said activator including
   a body defining a central bore and end bores of reduced diameter communicating with said central bore,
   a piston movably positioned within said bores, and
   means providing communication into said central bore on opposite sides of said piston,
   said piston including a connecting rod extending through one of said end bores and adapted to connect to said control valve,
   said piston having three effective pressure areas with two of said areas being opposed to the third of said areas,
   the effective pressure areas on said piston urging said piston towards shutdown direction being greater than the effective pressure areas on said piston urging said piston in the opposite direction.

2. A pressure control system according to claim 1 wherein
   said safety device is a shut-down valve connected to said fluid system whereby actuation thereof causes said fluid system to be shut down.

3. A pressure control system according to claim 1 wherein
said pilot valve is connected to said activator to reset said activator and said control valve responsive to fluid system pressures returning to normal.

4. A pressure control system according to claim 1, wherein
said activator and said control valve are only reset manually.

5. A pressure control system for a fluid system under pressure comprising
a pressure responsive pilot valve,
means connecting the pilot valve to a fluid system to be controlled for delivering fluid under pressure from said fluid system to said pilot valve,
said pilot valve including means for presetting a preselected pressure condition at which said pilot valve responds by discharging said fluid under pressure,
an activator,
a control valve,
said activator being mechanically interconnected to said control valve and being responsive to fluid pressures,
means connecting said pilot valve to said activator to supply and vent said fluid under pressure discharged therefrom to said activator,
a safety device having a pressure responsive actuator,
means supplying actuating fluid under pressure to said control valve,
means connecting said control valve to said safety device actuator to control the delivery of actuating fluid to said safety device actuator whereby on occurrence of said preselected pressure condition in said fluid system said safety device is actuated to control pressure in said fluid system,
said activator including
a body defining a central bore and end bores of reduced diameter communicating with said central bore,
a piston movably positioned within said bores, and
means providing communication into said central bore on opposite sides of said piston,
said piston including a connecting rod extending through one of said end bores and adapted to connect to said control valve,
said piston having an effective pressure area in the other of said end bores smaller than its effective pressure areas in said central bore,
the effective pressure areas of said piston in said central bore being equal.

6. A pressure control system according to claim 5, including
an override passage defined in said activator body in communication with the central bore of said body,
an override piston positioned within said override passage and adapted to engage said activator piston to retain said piston in normal position,
means exposing the side of said override piston away from said activator piston to the venting through said pilot to activate said override piston out of engagement with said activator piston responsive to a pressure differential when said pilot senses and responds to the preselected pressure condition, and
means on the exterior of said activator body for directly moving said override piston into engagement with said activator piston.

7. A pressure control system for a fluid system under pressure comprising
a pilot valve having a pair of control pressure connections, a supply pressure connection and a vent,
means for connecting said pilot valve to a fluid system to be controlled for delivering fluid under pressure from said fluid system to said pilot valve,
said pilot valve being responsive to a preselected high pressure and a preselected low pressure in said fluid system to provide a control pressure of said fluid under pressure at one of said control pressure connections with fluid pressure within said fluid system between said preselected limits, said pilot valve venting control pressure from said one of control pressure connections with fluid pressure within said fluid system being outside one of said preselected limits and said pilot valve supplying control pressure to the other of said control pressure connections with fluid pressure within said system being outside the other of said preselected limits,
a control valve,
an activator mechanically connected to operate said control valve and being responsive to fluid pressures,
a shutdown valve connected to said fluid system,
means supplying actuating fluid to said control valve,
means for connecting the control pressure connections of said pilot valve to said activator to bias said activator toward normal position responsive to normal fluid pressure within said fluid system,
the venting of one of said control pressure connections and pressurizing the other of such control pressure connections resulting in actuation of said activator to move said control valve to shutdown position,
means connecting said control valve to said shutdown valve to deliver said actuating fluid to said shutdown valve with the control valve in shutdown position,
said activator including
a body defining a central bore and end bores of reduced diameter communicating with said central bore,
a piston movably positioned within said bores, and
means providing communication into said central bore on opposite sides of said piston,
said piston including a connecting rod extending through one of said end bores and adapted to connect to said control valve,
said piston having an effective pressure area in the other of said end bores smaller than its effective pressure areas in said central bore,
the effective pressure areas of said piston in said central bore being equal.

* * * * *